Figure 2:
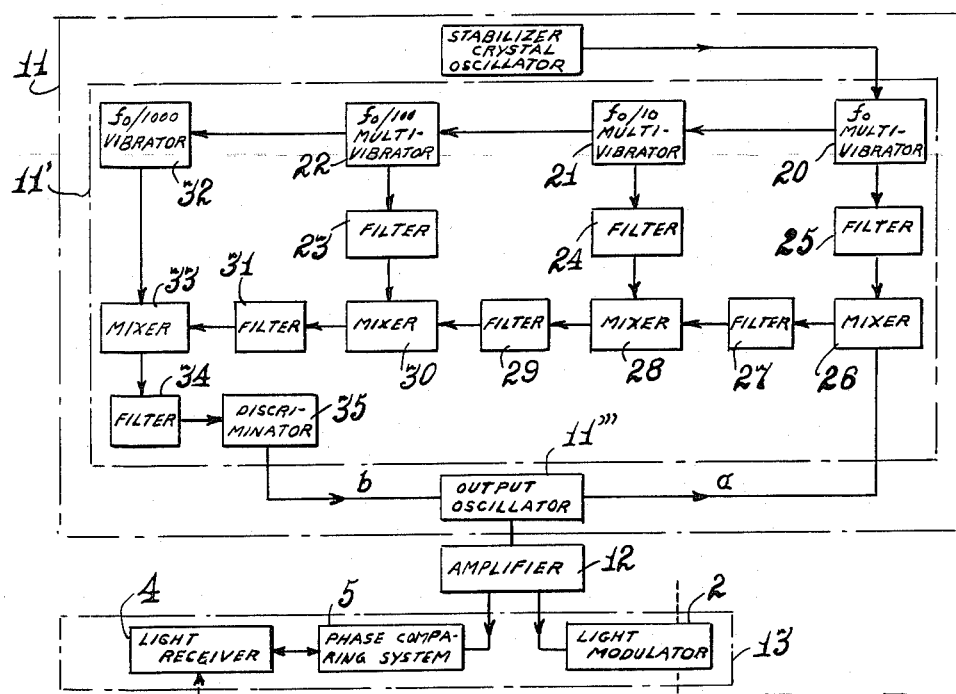

INVENTOR.
Hugo Pocher
BY
Samuel W. Kipnis
Atty.

United States Patent Office 2,964,990
Patented Dec. 20, 1960

2,964,990

SIGNAL MODULATION SYSTEM FOR ELECTRO-OPTICAL MEASUREMENTS OF DISTANCES

Hugo Pocher, Berlin-Friedenau, Germany, assignor to Askania-Werke A.G., Berlin-Friedenau, Germany, a corporation of Germany Filed May 13, 1957, Ser. No. 661,988

Claims priority, application Germany May 12, 1956

3 Claims. (Cl. 88—1)

This invention relates to a signal modulation system whereby distances and the like can be measured electro-optically and wherein a transmitter emits and a receiver receives a signal wave such as cyclically modulated light, means being provided for comparing the phase of the emitted signal with that of the received signal. The evaluation of the signal can be achieved by direct phase comparison or by other methods, for instance superposition of emitted and received signals and determination of resulting mixed beat frequencies.

It is the main object of the invention to improve such a system and to provide high precision of measurement by means of relatively simple construction and operation.

A more specific object is to establish freely selected frequencies of cyclic signal modulation, with high and sustained precision.

Heretofore the signal energy was modulated by direct influence of a tunable oscillator circuit, upon a signal energy modulating element such as a Kerr cell. Difficulties were encountered in such prior practice, since the oscillators, which must have a broad range of adjustability, were unable to maintain a predetermined frequency with the required accuracy. The usual remedy was, to measure the frequency of the oscillator at the time when the distance, to be determined by the system, was to be measured, and for this purpose to incorporate a frequency meter in the instrument, as an added element. This procedure was complex and at the same time inaccurate. The oscillators must provide, or be capable of providing, a substantial output; they must therefore be thermally stabilized, errors being caused by their tendency to drift. Thermal stabilization of a widely adjustable oscillator is impossible, where accuracy is required, it being known that the thermal coefficients of the oscillator circuit elements can be compensated only for discrete frequencies. Furthermore such compensation, over different frequency values as used in such a system, involves considerable reduction of the quality factor of the oscillator, in other words, considerably increased resistive dissipation of oscillatory energy, which additionally complicates the thermal compensation. It is an important object of the invention to avoid these difficulties.

This object has been achieved by incorporating, in a special oscillator system for a signal modulator system, a device controlled by a fixed-frequency oscillator, said device being adapted to apply a multiple-frequency conversion to the fixed frequency of said oscillator and to control an output oscillator in accordance with the converted frequency derived from the said oscillator of fixed frequency, thereby also controlling the emission of a modulated signal and the operation of a receiving and phase comparing system. This device may be of the type which is sometimes called frequency analyzer. Thus there is used a frequency-output controlling frequency analyzer in lieu of the frequency meters heretofore employed. The result is that the operation becomes substantially simpler and at the same time substantially more accurate; the permanent drifting, formerly encountered in the voltage source and therefore in the signal modulation, is safely eliminated, without substantial extra cost.

Figure 1:
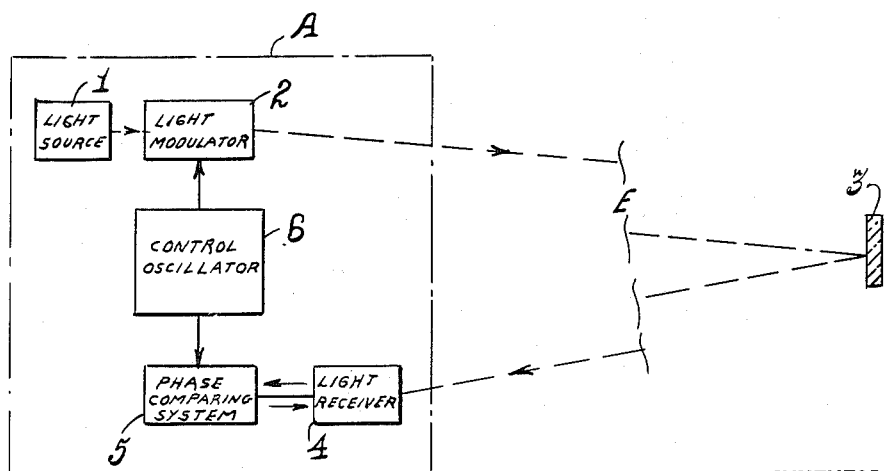

A typical embodiment of the invention is schematically illustrated in the drawing, wherein Figure 1 is a block diagram of the signal modulation system in its entirety and Figure 2 is a more detailed block diagram of certain parts of the system.

Referring to Figure 1, there is shown a light source 1, with modulator means 2 for impressing the required modulation upon the light stream from the source 1, for instance by modulation of the amplitude thereof, as by a basically known Kerr-Nicol system. The amplitude modulated light signal traverses the distance E to be determined; at the terminal point of said distance it is reflected by a suitable reflector 3. The reflected light retraverses the distance E and is received in a receiver 4 which may comprise a light cell; for simplicity's sake the reflected light ray has been drawn as continuing the incident ray. The transmitter 1, 2 and the receiver 4 are parts of an integral instrument A. This instrument also comprises a phase comparing system 5 for comparing the phase of the received signal (upper arrow from 4 to 5) with that of the emitted signal. A control oscillator 6 furnishes voltage for the comparing system 5 as well as voltage for the modulator 2.

In Figure 2 this control oscillator is shown in greater detail. It comprises an oscillator system 11 and an amplifier 12 for the output thereof; the output of the amplifier 12 being fed to a system 13 which comprises the elements 2 and 4 and generally the element, described above (arrows from 6 to 5 and 4).

The oscillator system 11 comprises a generator 11" of a fixed or normal frequency $f_0$, such for instance as a stabilized precision crystal oscillator. This normal frequency generator controls a frequency analyzer 11'. The analyzer in turn controls an output oscillator circuit 11''', by basically known circuitry which is shown as comprising a path $a$ from 11''' to 11' for the oscillations to be corrected and a return path $b$ from 11' to 11''' for the corrected oscillations.

The generator 11'', as mentioned, furnishes a fixed, non-drifting standard frequency $f_0$. Suitably fixed frequencies, derived from this standard, are derived and applied by circuit 11', which for this purpose may comprise for instance a series of multivibrators 20, 21, 22 ... The first of these vibrates at frequencies designated as $nf_0$, where $n$ equals any of the cardinal numbers 1, 2, 3 ... etc., up to 9. Correspondingly multivibrator 21 vibrates at 1, 2, 3 etc. and up to 9 times one-tenth of the standard, that is, at $$\frac{nf_0}{10}$$

and similarly 22 at $$\frac{nf_0}{100}$$

Several hundred frequencies are thus established, each of which is as free from drift as is the standard frequency $f_0$. One of each group of nine frequencies is then selected, by suitably adjustable filters 23, 24, 25 ... The sum of the filter-selected frequencies plus a frequency of $\frac{1}{1000} f_0$, generated at 32, is compared with the oscillation of circuit 11''', for instance by differential frequency formation in stages 26, 28, 30, 33 followed by differential frequency filters 27, 29, 31, 34 of suitable bandwidths. Thus there can be selected for the band of each filter 27, 29 etc., a single differential frequency, derived from one of the multiples of the standard, and from the frequency of output circuit 11'''.

For instance, where an output of 751 kc. is required a standard of 100 kc. may be generated at 11″. Harmonics of 100, 200, 300 . . . 900 kc. are derived at 20; 700 kc. is selected at 25 and mixed with the corresponding value from 11‴ at 26. Correspondingly 50 kc. is mixed at 28; 1 kc. at 30; and fractions thereof at 33. This can be continued in added stages; the more stages there are, the more precise is the output control. The stage frequencies may be multiples of powers of 10 as here described or may be differently selected.

Assuming that the frequency of 11‴, fed to system 26, 27 . . . via path a, is about to drift from 751 to 750.5 kc., this is detected in a discriminator stage 35. The correct components 700 kc. and 50 kc. pass the stages 26 to 31 without special response but the dropping off from 1 to .5 kc. causes a voltage change in 35. This in turn is fed to 11‴ via path b, so as to return the frequency of 11‴ to the predetermined value, thus locking this frequency to the value selected by the adjustable filter system 32, 23, 24, 25.

In this manner, a variety of frequency values suitable for signal modulation can be derived, in stable manner and without any need for a frequency measurement incident to each distance measurement, for instance, within the range of 3 to 20 mc. Each frequency can be established with such extreme precision as is required for the present purposes. An accuracy of one-millionth is often required in this field, and is achievable without great difficulty by the system described; frequency analyzers are known which maintains a desired frequency in said range with an accuracy of one ten-millionth ($10^{-7}$). Furthermore this accuracy can be maintained over a practically indefinite period of time, without any drifting off of the output of control oscillator 11‴, impressed in the control grid of amplifier 12. A phase comparison of substantially enhanced sensitivity becomes available by such output, applied to the system 13.

It will further be noted that the measurement of a distance or the like is greatly simplified by the use of the system as described. Heretofore it was necessary to apply a separate frequency measurement incident to each distance measurement, for instance by the superposed beat method. This was not only cumbersome; it also furnished results which were inferior to those of the system described herein, since the frequency measurement was difficult; for instance the determination of a zero beat differential was practically impossible except in most approximate manner, at high frequencies.

I claim:

1. A system for electro-optically measuring distances, comprising: means for generating a light signal; a modulator for cyclically modulating the signal at a frequency selected from a wide range of frequencies; an output oscillator for operating the modulator; a stabilizing system for the output oscillator, including means for generating at least one fixed frequency oscillation, a series of vibrators controlled by the generating means at multiples of said fixed frequency and each adapted to vibrate only at a number of integral multiples of the controlling frequency which number forms one of a series of decades of such multiples, means for selectively deriving from each of said vibrators oscillation at one of the corresponding multiple frequencies, whereby the series of vibrators and deriving means furnishes stable oscillation at a frequency selected from a wide range of frequencies, means for mixing successive decade components of the stable oscillation with corresponding decades of the output oscillator's oscillation, and means for discriminating incipient differences of mixed components in each decade, whereby the frequency of the output oscillator is locked to the selected stable oscillation; means for transmitting the light signal, modulated at the output oscillator's frequency, to a reflector positioned at the end of the distance to be measured; means for receiving the modulated, transmitted and reflected light signal adjacent the transmitting means; and means for comparing the phase of said selected stable oscillation with the phase of the received light signal for determining the distance to be measured.

2. A system as described in claim 1 wherein each of said vibrators is a multivibrator adapted to vibrate at a series of harmonics of said fixed frequency and each of said selective deriving means is a filter circuit adjustable to pass any one of the corresponding harmonics.

3. A system as described in claim 1 wherein the series of vibrators is adapted to vibrate at frequencies within the range of about 3 to about 20 megacycles per second.

References Cited in the file of this patent

UNITED STATES PATENTS

| | | |
|---|---|---|
| 1,750,668 | Green | Mar. 18, 1930 |
| 2,144,203 | Shanklin | Jan. 17, 1939 |
| 2,169,374 | Roberts | Aug. 15, 1939 |
| 2,248,727 | Strobel | July 8, 1941 |
| 2,324,077 | Goodale et al. | July 13, 1943 |
| 2,705,320 | Palmer | Mar. 29, 1955 |